United States Patent Office 2,828,119
Patented Mar. 25, 1958

2,828,119
WORK HANDLING APPARATUS

Paul F. Good and John B. Rogalski, Baltimore, Md., assignors to Westinghouse Electric Corporation, East Pittsburgh, Pa., a corporation of Pennsylvania Application December 15, 1954, Serial No. 475,416

3 Claims. (Cl. 266—4)

The present invention relates to workpiece handling apparatus and, more particularly, relates to workpiece handling apparatus for scanning or moving the contour surface of a workpiece relative to a workpiece treating member such an inductor coil.

It is an object of the present invention to provide an improved workpiece scanning apparatus.

It is an additional object of the present invention to provide an improved apparatus for scanning or moving workpiece surfaces having regular or irregular contours.

It is a further object of the present invention to provide improved apparatus for scanning the contour surface of a workpiece with substantially no limitation as to its shape past a workpiece treating device.

It is a different object of the present invention to provide an improved apparatus for scanning or moving workpieces having regular or irregular contour surfaces relative to a workpiece treating device at a substantially constant speed.

Figure 1:
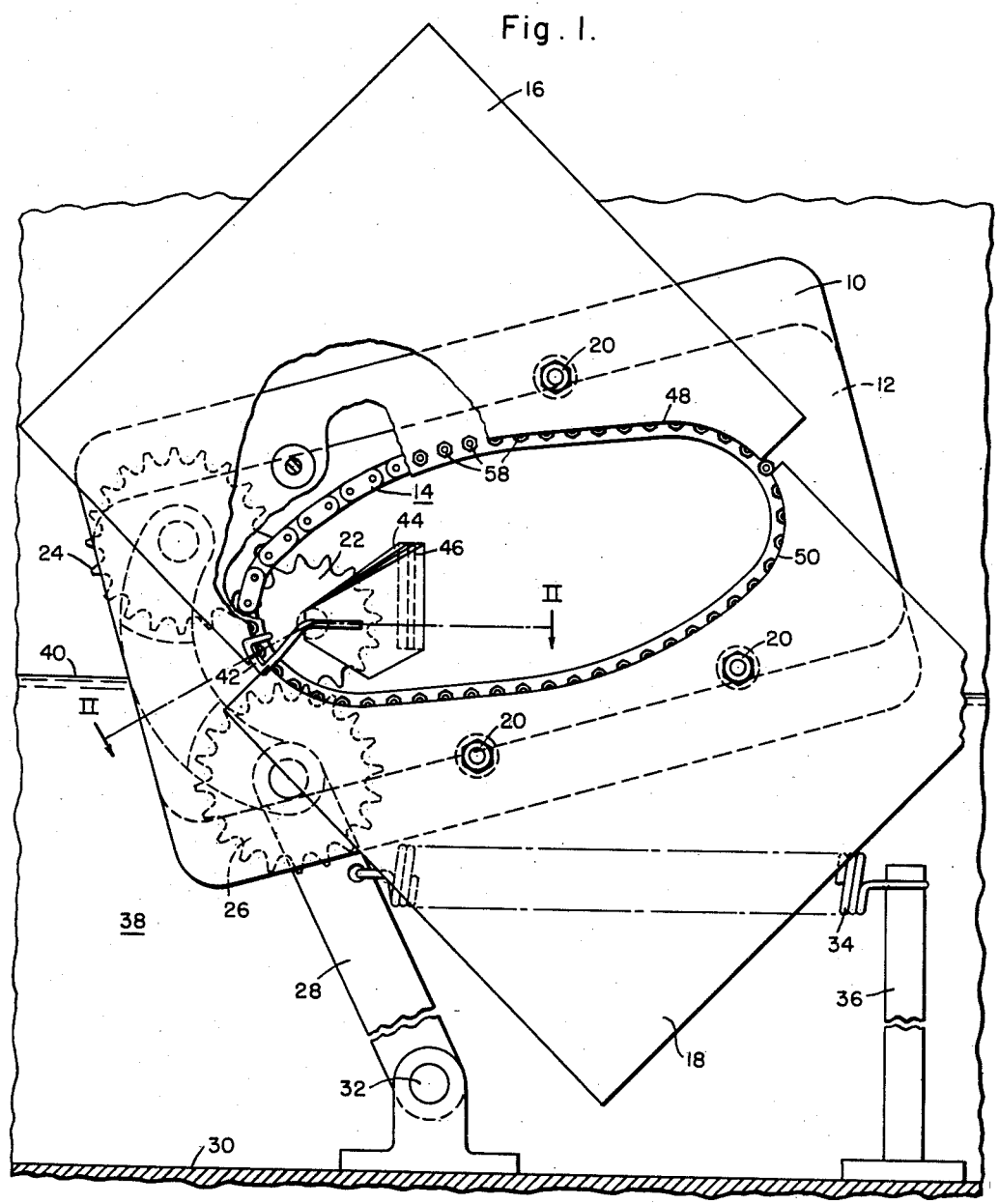
Figure 2:
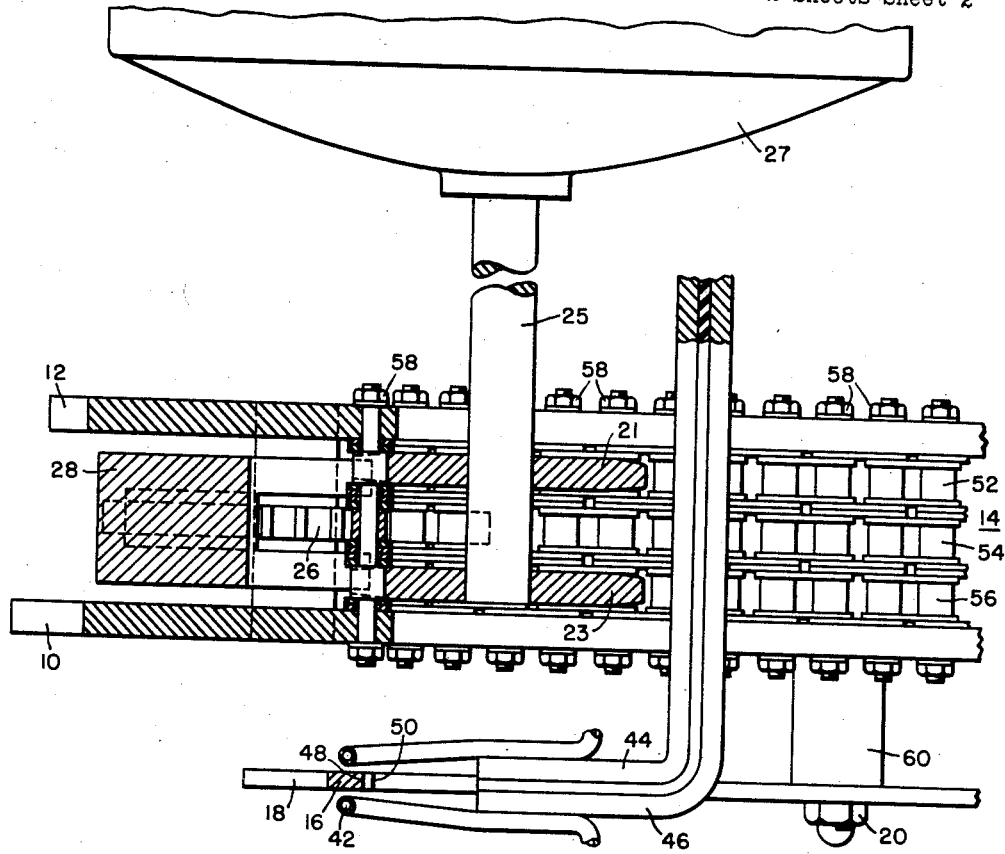

These and other objects, features and innovations of the present invention will become apparent from the following description taken in conjunction with the accompanying drawings, in which:

Figure 1 is a side view of apparatus in accordance with the present invention; and Fig. 2 is a top view of the apparatus shown in Fig. 1 taken along the line II—II.

In Fig. 1 there is shown a first work support member 10 which is in the form of an adapter plate and a second work support member 12 which is in the form of a backup plate, and is positioned behind the first work support member 10 in a direction perpendicular to the plane of the drawing of Fig. 1. An endless chain or equivalent member 14 is supported by and positioned between the first work support member 10 and the second work support member 12. A first workpiece 16 and a second workpiece 18 are supported by the work support assembly including the support members 10 and 12 and the endless chain member 14. Suitable bolts or fastener members 20 are provided for fastening the workpieces 16 and 18 to the work support assembly. A driver mechanism including a drive sprocket 22 is connected through a suitable connecting shaft to a driver motor (not shown in Fig. 1). The driver sprocket 22 intermeshes with the endless chain member 14. Positioned on the opposite side of the endless chain member 14 are a pair of cooperating drive or idler sprockets 24 and 26, which latter drive sprockets are supported on a common support arm 28, which latter support arm is pivotally connected to a support base 30 through a pivot connection 32. A spring bias tension member 34 is connected between the support arm 28 and a second support arm 36, which latter support arm 36 is fastened to the support base 30. The spring tension member 34 is operative to pull on the support arm 28 to position the sprockets 24 and 26 such that the endless chain member 14 is supported respectively between the driver sprocket 22 and the cooperating sprockets 24 and 26. The support base 30 may be in the form of a quench tank having a quench medium 38 therein, which has a quench medium level 40 as shown in Fig. 1.

A heat treating member 42 is shown in the form of a bonnet-type inductor coil which is supplied energy from a suitable power source, including energy supply conductors 44 and 46. The inductor coil 42 is radially positioned relative to the axis or center of the driver sprocket 22. The surface of the workpiece 16 to be heat treated is the contour surface or edge 48 and the surface of the workpiece 18 to be heat treated is the contour surface 50, which are positioned and supported by the support members 10 and 12 by means of a plurality of connecting members 20 such that the shape of the endless chain member 14 can be made to correspond to the shape of the contour surfaces 48 and 50.

In Fig. 2 there is shown the first support member or adapter plate 10 and the second support member or backup plate 12. The endless chain member 14 is shown as including effectively a triple width chain assembly comprising a first chain member 52, a second chain member 54 and a third chain member 56, which three chain members 52, 54 and 56 have substantially the same width and are fastened together and positioned between the first and second support members 10 and 12 by means of a plurality of connecting or fastener members 58. Each of these chains 52, 54 and 56 is made up of extended links, with each link fastened between the support members or plates 10 and 12 between a pair of the connecting or fastener members 58. The workpiece 16 is shown in Fig. 2 with its contour surface 48 within the inductor coil 42 for the heat treatment of said surface. Behind the sectioned portion of 16, that is, within the coil 42, there is shown the other workpiece 18 having the contour surface 50. Energy supply conductors 44 and 46 are shown connected to the inductor coil 42. Driver sprocket 22 is shown as comprising a first sprocket member 21 and a second sprocket member 23, which latter sprocket members are connected to the drive shaft 25 which, in turn, is connected to the driver motor 27. One of the cooperating sprockets 26 is shown positioned between the sprocket members 21 and 23 and on the opposite side of chain member 14, as well as the support arm 28, for the other cooperating sprocket 24. A fastener member 20 is shown for fastening the workpiece 18 to the work support assembly. A suitable pad or spacer member 60 may be provided in conjunction with the connecting member 20 between the workpiece and the work support assembly.

In the operation of the apparatus shown in Figs. 1 and 2, the work support assembly including the first support member 10, the second support member 12 and the intermediate chain member 14 can be initially arranged such that the shape of the chain member 14 corresponds to the shape of the contour surfaces 48 and 50 of the respective workpieces 16 and 18. One way of initially shaping the chain member 16 would be to first mark the contour surfaces 48 and 50 on the surface of the two work support members 10 and 12, and drill holes along this marking with the spaces between such holes being equal to the length of the individual extended links of the respective chain members 52, 54 and 56 of the chain assembly 14. Further, the portions of the work support members 10 and 12 within the interior of the chain member 14 should be removed such that said portions do not interfere with the operation of the driver sprocket 22 and the cooperating sprockets 24 and 26. The chain member assembly 14 is then assembled and fastened between the work support members 10 and 12. The work support assembly is then positioned between the driver sprocket 22 and the cooperating sprockets 24 and 26 as shown in Fig. 1, such that the driver sprocket 22 and the cooperating sprockets 24 and 26 support the work support assembly including the two workpieces 16 and 18. The drive motor 27 can then be energized to cause the driver sprocket 22 to intermesh with and move along the chain 14, such that the contour surfaces 48 and 50 of the respective workpieces 16 and 18 are scanned or moved through the bonnet inductor coil 42 for the heat treatment of these workpiece surfaces.

The upper level 40 of the quench medium 38 is so arranged such that the heated contour surfaces of the respective workpieces enter the quench medium and are submerged therein at a predetermined and desired time after the heat treatment of said surfaces as dependent upon the scanning speed of the workpiece contour surfaces, which speed is determined by the rotational speed of the drive sprocket. If desired, both of the workpieces can be completely heat treated in a single operation, or one of the workpieces can be heat treated, and the second workpiece which has emerged from the quench fluid can be unloaded from the work support assembly and replaced by an untreated workpiece, and the operation repeated one workpiece at a time.

The spring tension member 34 is operative to exert a force on the support arm 28, such that the cooperating sprockets 24 and 26 are held in position closely adjacent the driver sprocket 22, and, therefore, the work support assembly is supported between the driver sprocket 22 and the cooperating sprockets 24 and 26.

While a preferred form of the invention has been described, it is obvious that the principles are subject to application in many different ways and are subject to considerable modification. Suitable workpieces which can be contour scanned in accordance with the present invention are various knife members, cams and eccentrics. It should further be apparent from the teachings of the invention that the contour surface of the workpiece can be moved through the inductor coil 42 at substantially a constant speed or at any desired variable speed by suitably controlling the rotational speed of the driver sprocket 22 by means of the driver motor 27.

We claim as our invention:

1. In workpiece contour scanning apparatus for moving the contour surface of a workpiece relative to a stationary workpiece treating member, the combination of a first plate member and a second plate member, with said first and second plate members being operative for supporting said workpiece, a quenching bath, a chain member having a plurality of link members, said chain member being fastened between said first and second plate members and shaped to correspond to said contour surface, each of said link members being fastened directly to said first and second plate members, and driver means including a driver motor for cooperating with said chain member to scan said contour surface relative to said workpiece treating member, said workpiece, said plate members, and said chain member being mounted so as to be at least partially immersed in said quenching bath.

2. In workpiece contour scanning apparatus for moving the contour surface of a workpiece relative to a stationary workpiece treating member, the combination of a first plate support member and a second plate member which is parallel to said first plate member, with said first and second plate members being operative for supporting said workpiece, a chain member fastened between said first and second plate members and shaped to correspond to said contour surface, said chain member having a first and second tier, and driver means including a driver motor for cooperating with said chain member to scan said contour surface relative to said workpiece treating member, with said driver means further including a first sprocket member connected to said motor and operative with said first tier of said chain member, and a second sprocket member positioned relative to the first sprocket member such that said chain member is positioned between the first and second sprocket members, said second sprocket member being operative with said second tier of said chain member.

3. In work handling apparatus for treating an irregular edge of a flat workpiece, the combination of a first plate member and a second plate member, a drive chain sandwiched between said plate members, individual devices for fastening the links of said chain to said plate members whereby the chain is made to conform to the irregular edge of said flat workpiece, means for fastening said workpiece to said plate members whereby the plate members are spaced from said flat workpiece and are substantially parallel thereto, sprocket means rotatable about an axis for cooperatively engaging said drive chain to move said irregular edge past said axis, and a member extending radially outwardly from said axis for treating said irregular surface as it passes said axis.

References Cited in the file of this patent

UNITED STATES PATENTS

| 1,711,633 | Dornseif | May 7, 1929 |
| 1,809,653 | Wagner et al. | June 9, 1931 |
| 1,957,489 | Comstock | May 8, 1934 |
| 2,197,430 | Graves et al. | Apr. 16, 1940 |
| 2,504,815 | Detuno et al. | Apr. 18, 1950 |
| 2,665,894 | Baker et al. | Jan. 12, 1954 |

FOREIGN PATENTS

| 141,118 | Australia | Mar. 25, 1935 |